(12) United States Patent
Bensley

(10) Patent No.: US 8,337,782 B2
(45) Date of Patent: Dec. 25, 2012

(54) COUPLING SYSTEM FOR USE WITH FLUID DISPLACEMENT APPARATUS

(75) Inventor: Douglas S. Bensley, Ludlow, VT (US)

(73) Assignee: Ivek Corporation, North Springfield, VT (US)

( * ) Notice: Subject to any disclaimer, the term of this patent is extended or adjusted under 35 U.S.C. 154(b) by 1092 days.

(21) Appl. No.: 12/252,595

(22) Filed: Oct. 16, 2008

(65) Prior Publication Data
US 2009/0120967 A1    May 14, 2009

Related U.S. Application Data

(60) Provisional application No. 60/980,333, filed on Oct. 16, 2007.

(51) Int. Cl.
*B01L 99/00* (2010.01)
*B01L 3/02* (2006.01)

(52) U.S. Cl. .......... 422/544; 422/501; 335/285

(58) Field of Classification Search .......... 422/501, 422/544; 24/303; 446/92; 439/39; 335/285–295, 335/306; 285/9.1
See application file for complete search history.

(56) References Cited

U.S. PATENT DOCUMENTS

| | | | |
|---|---|---|---|
| 4,528,161 A | 7/1985 | Eckert | |
| 4,616,796 A * | 10/1986 | Inoue | 248/206.5 |
| 4,671,123 A | 6/1987 | Magnussen, Jr. et al. | |
| 4,779,467 A | 10/1988 | Rainin et al. | |
| 4,790,236 A | 12/1988 | Macdonald et al. | |
| 4,932,313 A | 6/1990 | Gutknecht | |
| 5,421,722 A * | 6/1995 | Stemmann | 433/189 |
| 5,425,763 A | 6/1995 | Stemmann | |
| 5,896,961 A * | 4/1999 | Aida et al. | 188/378 |
| 6,254,832 B1 | 7/2001 | Rainin et al. | |
| 6,408,706 B1 | 6/2002 | Nagai et al. | |
| 6,499,907 B1 | 12/2002 | Baur | |
| 6,736,049 B2 | 5/2004 | Cautenet et al. | |
| 6,739,478 B2 | 5/2004 | Bach et al. | |
| 7,541,707 B2 | 6/2009 | Hochhalter et al. | |

OTHER PUBLICATIONS

US Office Action dated Nov. 15, 2007, received in related U.S. Appl. No. 11/113,531.
US Office Action dated May 17, 2007, received in related U.S. Appl. No. 11/113,531.
US Office Action dated Jul. 6, 2009 received in related U.S. Appl. No. 11/620,188.

* cited by examiner

*Primary Examiner* — Jan Ludlow
(74) *Attorney, Agent, or Firm* — Grossman Tucker Perreault & Pfleger, PLLC

(57) ABSTRACT

A magnetic coupling system may be used in a fluid displacement apparatus to magnetically couple a drive shaft to a piston. The magnetic coupling system may include first and second magnetic couplers at the ends of the drive shaft and piston, respectively. The first magnetic coupler and second magnetic coupler may be configured to exert an attractive force. A bearing between the magnetic couplers reduces friction and side loading.

9 Claims, 4 Drawing Sheets

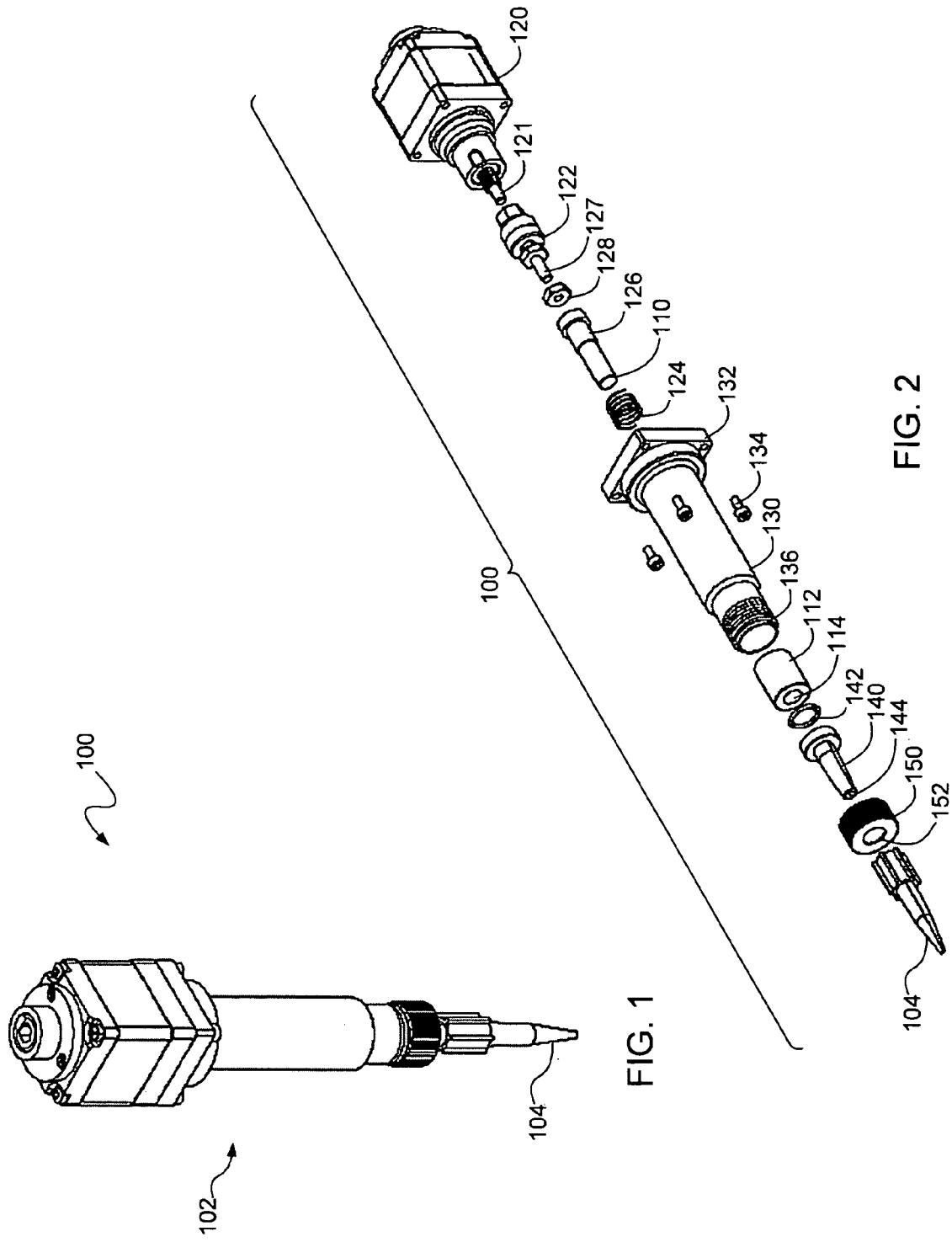

COUPLING SYSTEM FOR USE WITH FLUID DISPLACEMENT APPARATUS

RELATED APPLICATIONS

The present application claims the benefit of U.S. Provisional Application Ser. No. 60/980,333 filed Oct. 16, 2007, and is related to U.S. patent application Ser. No. 11/620,188, filed Jan. 5, 2007, both of which are herein incorporated by reference.

TECHNICAL FIELD

The present disclosure relates to coupling systems and more particularly, to a magnetic coupling system for use with a fluid displacement apparatus.

BACKGROUND INFORMATION

Fluid transfer devices (e.g., pipette mechanisms and pumps) are used to aspirate, dispense and transfer small volumes of fluid in many applications. The devices may range from simple glass tubes to more elaborate mechanical displacement devices. In either case, the devices operate by displacing fluid and a seal is used to hold the displaced fluid, which facilitates the liquid transfer. Traditional devices use displacement pistons with mechanical seals, such as lip seals or o-rings, to prevent air from entering the displacement chamber. These seals can be run dry, and wear eventually causes the seal to leak and degrades accuracy of the device.

Such devices may use a linear actuator to provide linear motion to the displacement piston. Couplings and other structures may be used to couple the linear actuator to the displacement piston. Misalignment of the actuator to the piston may result in premature seal degradation and may adversely affect the accuracy of the device during fluid transfer. Magnetic couplers may be used to prevent axial and/or angular misalignment.

Although magnetic couplers prevent axial and/or angular misalignment, the attractive forces of the magnets sometimes result in side loads on the piston. For example, the magnets may tend to center themselves and a substantial lateral force may be required to overcome the attractive forces of the magnets, resulting in a somewhat rigid magnetic coupling. This rigidity and magnetic resistance may translate into side loading on the piston against the wall, which may adversely affect performance of a displacement apparatus using the magnetic coupling system, particularly in precision dispensing applications.

BRIEF DESCRIPTION OF THE DRAWINGS

These and other features and advantages will be better understood by reading the following detailed description, taken together with the drawings wherein:

FIG. 1 is a perspective view of a fluid transfer device, consistent with one embodiment of the present disclosure.

FIG. 2 is an exploded perspective view of the fluid transfer device shown in FIG. 1.

DETAILED DESCRIPTION

Referring to FIG. 1, a fluid transfer device 100, consistent with one embodiment of the present invention, may include a liquid sealed fluid displacement apparatus 102 and a fluid receiving member 104. The fluid displacement apparatus 102 may be used to displace precise volumes of fluid into a displacement chamber. Displacing the fluid creates a negative pressure in the displacement chamber (i.e., suction), which may cause a precise volume of fluid to be drawn into the fluid receiving member 104. In one embodiment, the fluid displaced by the displacement apparatus 102 is air and the fluid drawn into the fluid receiving member 104 is a liquid. Those skilled in the art will recognize that various other fluids (both gases and liquids) may be displaced and/or transferred. The fluid transfer device 100 and/or displacement apparatus 102 may thus be used in fluid dispensing and metering applications, such as pipetting, aliquoting, and bulk dispensing.

The fluid receiving member 104 may be removably coupled to the displacement apparatus 102. The fluid receiving member 104 includes a fluid passage or channel that is capable of receiving a volume of fluid and is in communication with the displacement chamber. Examples of the fluid receiving member 104 include, but are not limited to, a cannula, plastic tubing, a conical pipette tip, or a stainless nozzle. Those skilled in the art will recognize that various types of fluid receiving members may be coupled to the displacement apparatus 102 for use in various types of applications.

Figure 3:
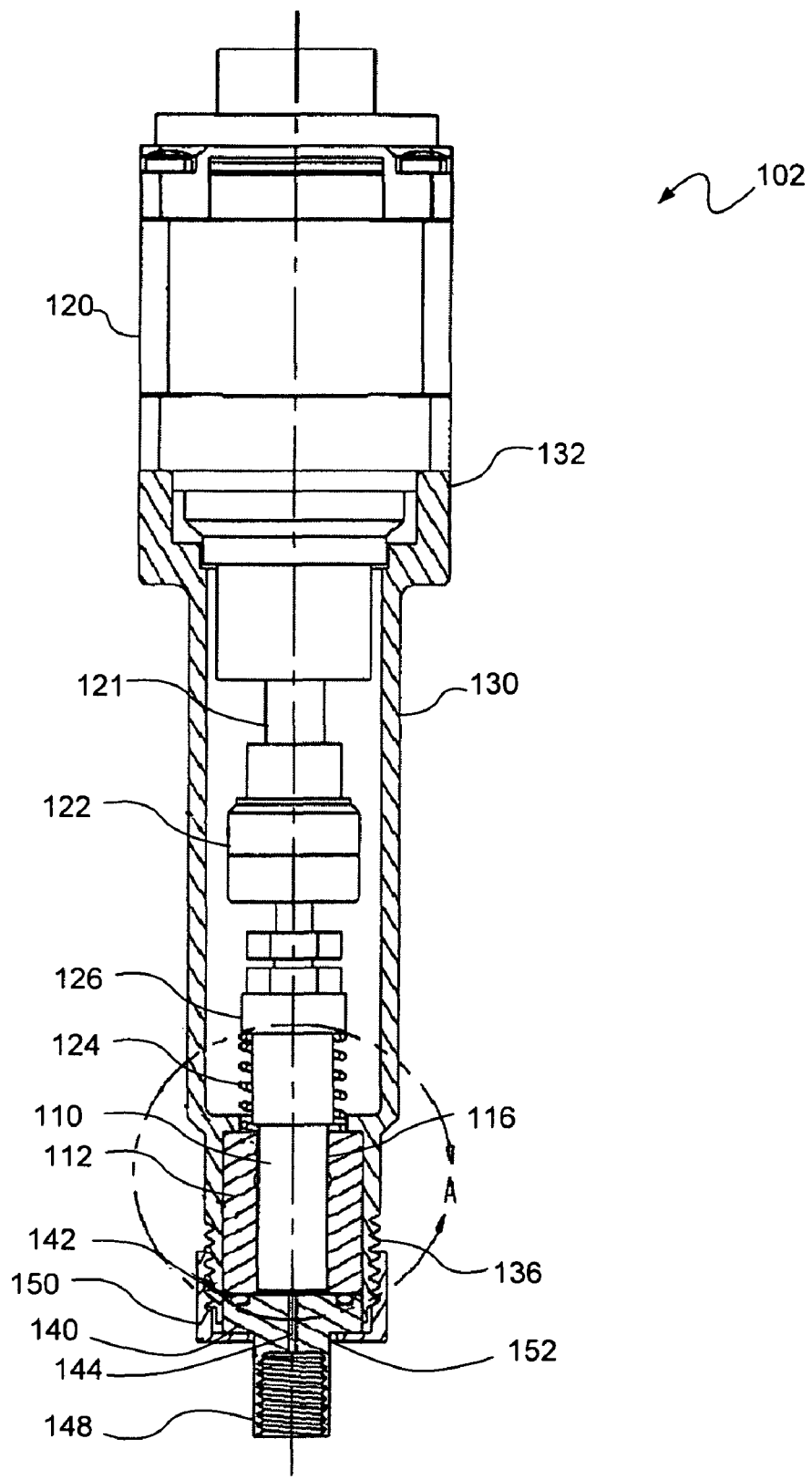
FIG. 3 is a cross-sectional view of a liquid sealed fluid displacement apparatus that may be used in a fluid transfer device, consistent with one embodiment of the present disclosure.

Referring to FIGS. 2 and 3, one embodiment of the fluid displacement apparatus 102 includes a piston 110 and a cylinder 112 receiving the piston 110. The cylinder 112 defines a displacement chamber 114, and the piston 110 causes displacement of fluid, such as air, when the piston 110 retracts from the displacement chamber in the cylinder 112. The piston 110 and the cylinder 112 may define a close clearance 116 configured to receive a sealing fluid. The clearance 116 may be configured with a dimension to maintain the sealing fluid between the piston 110 and the cylinder 112. In other words, the tight fit of the piston 110 and the cylinder 112 substantially prevents the sealing fluid from leaking out. The total diametrical clearance 116 may be in a range of about 50 to 500 millionths of an inch and more specifically approximately 100 millionths of an inch. One embodiment of the piston 110 and the cylinder 112 may be made of a ceramic material such as alumina or zirconia ceramic.

The sealing fluid in the clearance 116 between the piston 110 and the cylinder 112 prevents fluid from entering the displacement chamber 114 formed when the piston 110 is retracted. The sealing fluid may be a silicone oil or other similar fluid. Those skilled in the art will recognize other types of sealing fluid that are capable of sealing the clearance 116 and that are capable of remaining within the clearance 116.

The fluid displacement apparatus 100 may also include a linear actuator 120 and a coupling 122 between the linear actuator 120 and the piston 110. The coupling 122 may be coupled directly to a drive shaft 121 of the linear actuator 120. The linear actuator 120 may be a lead screw driven captive shaft linear actuator, such as the type available from Hayden Switch & Instrument, Inc. as part no. P28H49-2.1-001. The coupling 122 may be a floating coupling that compensates for angular and lateral misalignment when driving the close clearance ceramic piston/cylinder components.

A compression spring 124 may be positioned against the piston 110 biasing the piston away from the cylinder 120 to compensate for axial backlash, which may be present in the coupling 122 and/or the lead screw in the linear actuator 120. According to one embodiment, the piston 110 may include a piston cap 126 having at least two diameters. The spring 124 may be captured between the piston cap 126 and the cylinder 112 such that the spring 124 is under compression (e.g., approx. 2 lbs.) when the piston 110 is fully inserted into the cylinder 112. The piston cap 126 may be made of metal and may be attached to the piston 110 by interference fit, adhesive bonding, or other mechanical fastener. The coupling 122 may be coupled to the piston cap 126 using a threaded stud 127 and lock-nut 128.

A housing 130 may be coupled to the linear actuator 120 and may enclose at least the piston 110, the cylinder 112, the coupling 122, and the spring 124. The linear actuator 120 may be coupled to one end 132 of the housing 130, for example, using fasteners 134. The cylinder 112 may be rigidly mounted within the other end 136 of the housing 130. The piston 110 and the coupling 122 may be located within the housing 130 in a manner that allows the piston 110 and the coupling 122 to move axially within the housing 130. Although the housing 130 is shown as generally cylindrical, the housing may have other shapes and configurations.

A port fitting connector 140 may be located at the other end 136 of the housing 130, for example, adjacent to the cylinder 112. The end of the cylinder 112 may be sealed with a static o-ring 142 held against the port fitting connector 140. The port fitting connector 140 may include a port passage 144 that provides fluid communication between the displacement chamber 114 and the fluid passage in the fluid receiving member 104. The fluid receiving member 104 may be coupled to the port fitting connector 140, for example, using a commercially available gas tight fitting. One exemplary embodiment of the port fitting connector 140 may include a ¼-28 flat bottom boss 148, although a wide variety of fluid connections may be used. The port fitting connector 140 may allow the fluid receiving device 104 to be easily changed without tools. Those skilled in the art will recognize that various types of commercially available or custom-designed port fitting connectors may be used for different applications.

The port fitting connector 140 may be retained against the cylinder 112 with a cap 150 that engages the end 136 of the housing 130. One embodiment of the cap 150 may threadably engage a straight thread on the end 136 of the housing 130. The cap 150 may include a clearance hole 152 in the center such that the port fitting connector 140 protrudes through the clearance hole 152. The cap 150 may thus secure both the port fitting connector 140 and the cylinder 112 to the housing 130.

Figure 4:
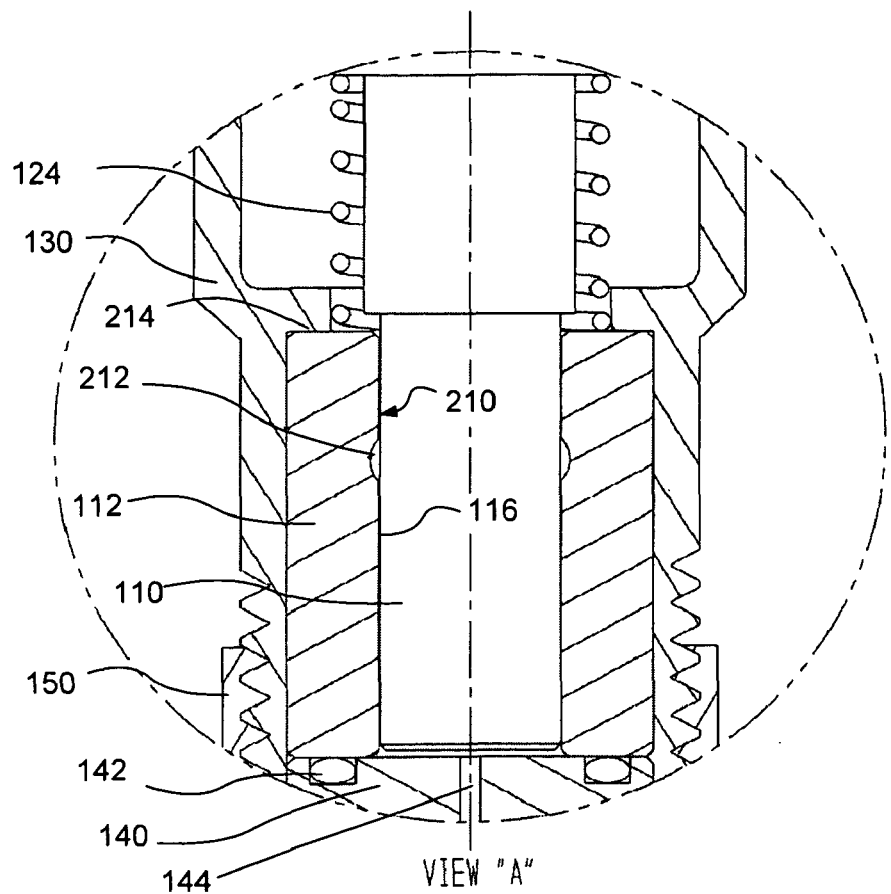
FIG. 4 is an enlarged cross-sectional view of the piston and cylinder arrangement in the liquid sealed fluid displacement apparatus shown in FIG. 3.

According to one embodiment of the piston and cylinder arrangement, shown in FIG. 4, the cylinder 112 includes an inner wall 210 with an annular groove 212, which serves as a sealing fluid reservoir. The sealing fluid may fill the annular groove 212 as well as the clearance 116 between the piston 110 and the cylinder 112. The annular groove 212 may be located about 0.125 inches from the end 214 of the cylinder 112 and may have a depth of about 0.012 inches and a width of about 0.062 inches. Alternatively, the cylinder 112 may not include the annular groove 212 and the sealing fluid may only be in the clearance 116.

Figure 5:
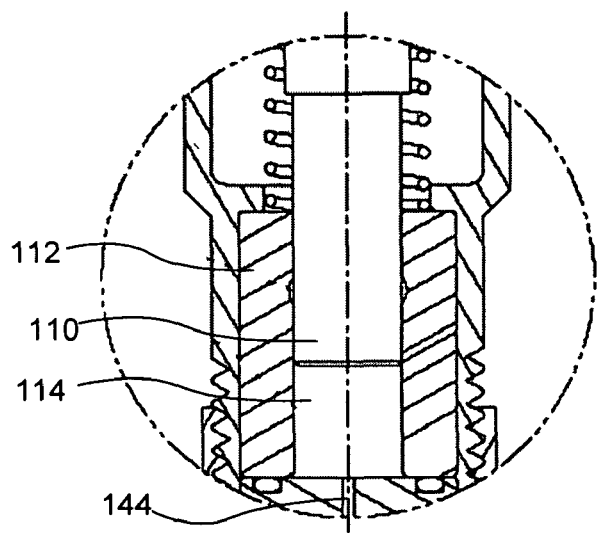
FIG. 5 is an enlarged cross-sectional view of the piston and cylinder arrangement in FIG. 4 forming a displacement chamber.
Figure 6:
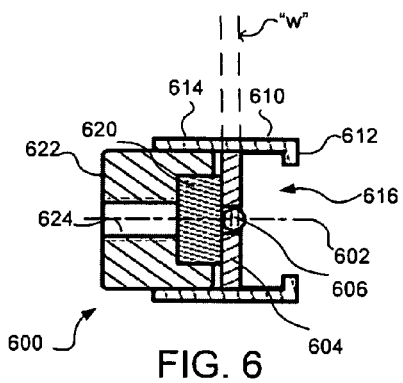
FIG. 6 is a cross-sectional view of a magnetic coupler, consistent with an embodiment of the present disclosure.
Figure 7:
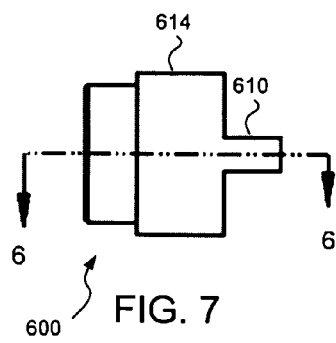
FIG. 7 is a side view of the magnetic coupler shown in FIG. 6.

One method of operation of the fluid displacement apparatus is described in reference to FIGS. 4 and 5. As shown in FIG. 4, the piston 110 may be fully inserted into the cylinder 112 without contacting port fitting connector 140. As shown in FIG. 5, the piston 110 may retract from this position to pull fluid, such as air, into the displacement chamber 114 through the port passage 144 in the port fitting connector 140. In one embodiment, the piston 110 may be retracted up to about 0.25 in.

In use in a fluid transfer application, the fluid receiving member 104 may be coupled to the port fitting connector 140. The piston 110 usually starts in its fully inserted position (as shown in FIG. 4). The fluid receiving member 104 may then be immersed in the sample fluid. The linear actuator 120 may then retract the piston 110 to create suction and pull a desired amount of fluid into the fluid receiving member 104. When the fluid receiving member 104 is charged with a desired amount of liquid, it may be removed from the sample fluid and relocated to a dispensing target. The linear actuator 120 may then be commanded to index the piston 110 into the cylinder 112 and the sample fluid is dispensed out in part or in whole. Those skilled in the art will recognize that there are many possible operational modes. Those skilled in the art will also recognize that the fluid transfer device 100 may be integrated into automated systems using standard controls.

The movement of the piston 110 may be precisely controlled by the linear actuator 120 to control the volume of fluid that is drawn into the fluid receiving member 104 and the volume of fluid that is dispensed from the fluid receiving member 104. Embodiments of the fluid transfer device 100 may be capable of total volumes in a range of less than about 1 µL to over 5000 µL and resolutions in a range from about 0.02 µL/Full Step to 0.20 µL/Full Step. The exemplary embodiment of the fluid transfer device 100 is capable of running for millions of cycles without wear or leakage.

FIGS. 6-9 illustrate one embodiment of a magnetic coupling system that may be used to couple a piston to a drive shaft of a linear actuator, for example, in the embodiments of the fluid displacement apparatus and/or fluid delivery device described above. The linear actuator may include any type of linear actuator that provides movement in a linear direction including, without limitation, a linear actuator using a leadscrew, a linear actuator using an air cylinder, or a linear actuator using a solenoid. In a fluid displacement apparatus or fluid delivery device, the magnetic coupling system may compensate for misalignment when the drive shaft is moving the piston (e.g., during either suction or discharge). The magnetic coupling system may also be used in other piston and cylinder assemblies where a linear actuator is used to drive the piston in the cylinder.

In general, the magnetic coupling system includes first and second couplers 600, 800 with at least one bearing 606 located between the couplers 600, 800, which reduces side loading on the piston, as will be described in greater detail below. The first magnetic coupler 600 may be secured to an actuator drive shaft, such as the drive shaft 121 shown in FIG. 2. The first magnetic coupler 600 may include tangs 610 extending longitudinally toward the second magnetic coupler 800 and at least a first magnetic portion or magnet 620. The tangs 610 may include inward portions 612 extending radially inwardly toward a longitudinal axis 602 of the first magnetic coupler 600 to define a coupling region 616 between the tangs 610. The first magnetic portion or magnet 620 is generally located in the coupling region 616 between the tangs 610.

According to one embodiment, the first magnetic coupler 600 may include a hub 622 and the tangs 610 may extend from a ring 614 that is press fit over the hub 622. The hub 622 may also include a recess that receives the magnet 620, for example, with the south pole facing outward. The magnet 620 may be secured in the recess of the hub 622, for example, using an adhesive such as the type known as Loctite® 411. The hub 622 may also include a region 624 configured to receive a portion of the drive shaft to couple the first magnetic coupler 600 to the drive shaft, for example, by threadably engaging an end of the drive shaft. The hub 622 may be made of stainless steel or other suitable material. The ring 614 and tangs 610 may be made of stainless steel or other suitable material. In one example, the magnet 620 may be made of any suitable ferromagnetic material.

Figure 9:
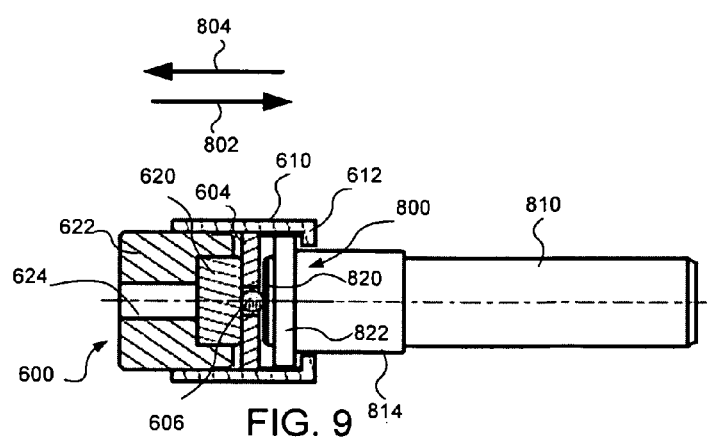
FIG. 9 is cross-sectional view of the magnetic coupling system shown in FIG. 8.

The first magnetic coupler 600 may also include at least one bearing 606, such as a ball bearing, which may be retained by a retainer 604. Although a ball bearing is shown, other shaped bearings may also be used. As shown in FIG. 9, the bearing 606 may be positioned between the first magnetic portion 620 of the first magnetic coupler 600 and a second magnetic portion 820 of the second magnetic coupler 800. Thus, the bearing 606 separates the magnetic portions 620, 820 and is capable of rolling between the magnetic portions 620, 820, thereby reducing friction. The retainer 604 limits the radial movement of the bearing 606 while allowing the bearing 606 to roll. By reducing the friction between the magnetic portions 620, 820, side loading on a piston 810 against the side wall (not shown) receiving the piston 810 may also be reduced. Although the attractive force between the magnetic portions 620, 820 is reduced by separating the magnetic portions 620, 820 with the bearing 606, sufficient magnetic force exists to maintain the coupling.

The bearing 606 may be located proximate the longitudinal axis 602 of first magnetic coupler 600. In some embodiments, the bearing 606 may have a diameter that is slightly greater than the width "w" of retainer 604 such that the bearing 606 extends beyond the retainer 604 to contact the magnetic portions 620, 820. The bearing 606 may be configured to move or float radially within retainer 604, for example, about 0.007 in. The bearing 606 may be constructed out of ferromagnetic or non-ferromagnetic materials.

The retainer 604 may be coupled to the tangs 610 and/or magnet 620. The retainer 604 may be monolithically formed with tangs 610 and/or may be coupled to tangs 610 using any of a variety of affixation methods, including, but not limited to bonding, adhesives, welding, etc. In some embodiments, the retainer 604 may have a generally circular or ring shape and may contact portions of ring 614. The retainer 604 may be constructed out of a variety of different materials, including, but not limited to polymeric, ceramic, and metallic materials. For example, in some embodiments, the retainer 604 may be constructed out of plastic (e.g., a plastic ring) and may include an aperture configured to receive the bearing 606.

Figure 8:
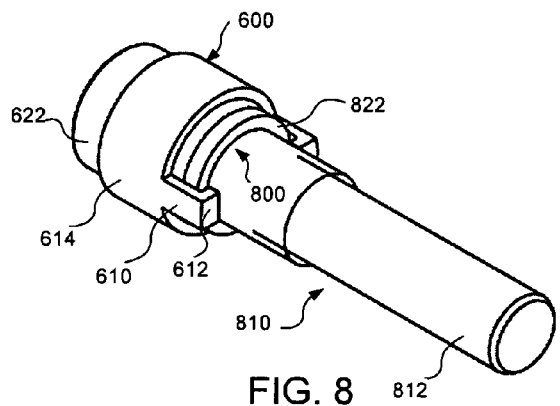
FIG. 8 is a perspective view of a magnetic coupling system including the magnetic coupler shown in FIG. 6 coupled to a second magnetic coupler.

As shown in FIGS. 8 and 9, the second magnetic coupler 800 may be located at one end of a piston 810 including a piston body 812 and may be configured to magnetically and mechanically engage the first magnetic coupler 600. The piston body 812 may be configured and dimensioned to fit in a displacement chamber of a cylinder, for example, as described above. The second magnetic coupler 800 may include at least a first magnetic portion or magnet 820 and one or more radial portions 822 extending radially from the coupler 800. The radial portion(s) 822 may include a single radial portion extending annularly around the second magnetic coupler 800 or may include a plurality of radial portions that are spaced annularly around the second magnetic coupler 800.

According to one embodiment, the second magnetic coupler 800 may include an end cap 814 that fits over one end of the piston body 812. The end cap 814 may include the radial portion(s) 822 and a recess that receives the magnet 820, for example, with the north pole facing outward. The end cap 814 may be shrink fit installed over the end of the piston body 812 or secured using other techniques known to those skilled in the art. The magnet 820 may be secured in the recess of the end cap 814, for example, using an adhesive such as the type known as Loctite® 411. The end cap 814 may be made of stainless steel. The magnet 820 may be made of any suitable ferromagnetic material.

To couple the first magnetic coupler 600 and the second magnetic coupler 800, the radial portion(s) 822 of the second magnetic coupler 800 may be positioned in the coupling region 616 of the first magnetic coupler 600. When coupled, as shown in FIG. 9, the first and second magnets 620, 820 may be magnetically engaged as a result of the magnetic forces. There may be a clearance (e.g., of about 0.010 in.) between the tangs 610 and the radial portion(s) 822. Even if the magnets 620, 820 become magnetically disengaged, the inward portions 612 of the tangs 610 may mechanically engage the radial portion(s) 822 to prevent complete decoupling.

During operation of one embodiment of a displacement apparatus including the magnetic coupling system, a displacement stroke may result in the first coupler 600 pushing the piston 810, for example, in the direction of the arrow 802 shown in FIG. 9. A suction stroke may reverse direction with the magnetic forces resulting in the coupler 600 pulling the piston 810 back, for example, in the direction of arrow 804. In the event that the piston 810 resists, the magnets 620, 820 in the first and second couplers 600, 800 may separate, and the inward portions 612 of the tangs 610 may mechanically engage the radial portion(s) 822 to pull the piston 810 back.

In other embodiments, the hub 622, magnet 620, and/or tangs 610 of the first magnetic coupler 600 may be formed as one piece of material and/or the radial portion(s) 822 and the magnetic portion 820 of the second magnetic coupler 800 may be formed as one piece of material. The radial portion(s) 822 and the magnetic portion 820 of the second magnetic coupler 800 may also be formed as one piece of material with the piston body 812. In these embodiments, the material may be a material capable of being magnetized in at least one region to form the magnetic portion.

Accordingly, by reducing the side loading on the piston, the bearing between the magnetic couplers may reduce the backlash present during operation and improve the precision, particularly when used in precision liquid dispensing applications. For example, test data indicates both the improved precision and the reduction in backlash when a magnetic coupler including a bearing is used. A test was conducted using a reagent metering pump to evaluate the incremental precision. Test data related to an experimental actuator having a standard magnetic coupler indicates a coefficient of variation (CV) of 1.27%. In contrast, test data related to an experimental actuator with the ball bearing, as described above, indicates a CV of 0.52%. A separate test measured and recorded the lost motion of the piston or backlash after a motion reversal of the piston. The results of the backlash test indicate that backlash is reduced when using the magnetic coupler with the ball bearing.

Consistent with one aspect of the present disclosure, a magnetic coupling system may include a first magnetic coupler including at least a first magnetic portion and a second magnetic coupler configured to engage the first magnetic coupler. The second magnetic coupler may include at least a second magnetic portion, the second magnetic portion and the first magnetic portion configured to exert an attractive force. The magnetic coupling system may further include at least one bearing positioned against the first magnetic portion and configured to be coupled between the first magnet portion and the second magnet portion.

Consistent with another aspect, a fluid displacement apparatus includes a linear actuator and a drive shaft coupled to the linear actuator. The drive shaft includes a first magnetic coupler at one end of the drive shaft. A piston is magnetically coupled to the drive shaft of the linear actuator and includes a second magnetic coupler at one end of the piston. The second magnetic coupler is configured to magnetically engage the first magnetic coupler and configured to mechanically engage the first magnetic coupler if the couplers disengage magnetically. At least one bearing is positioned between the first magnetic coupler and the second magnetic coupler. The fluid displacement apparatus further includes a cylinder defining a displacement chamber for receiving the piston.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A magnetic coupling system comprising:
a first magnetic coupler including at least a first magnetic portion;
a second magnetic coupler configured to engage the first magnetic coupler, the second magnetic coupler including at least a second magnetic portion, the second magnetic portion and the first magnetic portion configured to exert an attractive force;
a single rolling bearing positioned against the first magnetic portion proximate a longitudinal axis of the first magnetic coupler and configured to be coupled between the first magnetic portion and the second magnetic portion; and
a retainer coupled to the first magnetic coupler and configured to allow the single rolling bearing to roll between the first and second magnetic portions and to limit radial movement of the single rolling bearing relative to the longitudinal axis while allowing the single rolling bearing to roll.

2. The magnetic coupling system of claim 1, wherein the bearing is a ball bearing, the retainer has a ring shape and includes an aperture, and wherein the ball bearing sits in the aperture of the ring in contact with the first magnetic portion and with a portion of the ball bearing extending beyond the ring.

3. The magnetic coupling system of claim 2 wherein the retainer is made of plastic.

4. The magnetic coupling system of claim 1 wherein the first magnetic coupler includes tangs extending axially relative to the first magnetic coupler and radially inwardly toward a longitudinal axis of the first magnetic coupler, the tangs defining a coupling region, and wherein the second magnetic coupler includes at least one radial portion extending radially outwardly from the second magnetic portion, the radial portion being configured to be received in the coupling region of the first magnetic portion such that the first magnetic portion is configured to magnetically engage the second magnetic portion and the tangs are configured to mechanically engage the radial portion if the magnetic portions disengage magnetically.

5. The magnetic coupling system of claim 4 wherein the first magnetic coupler includes at least two of the tangs extending from opposite sides of the first magnetic coupler.

6. The magnetic coupling system of claim 5 wherein the radial portion extends annularly around the second magnetic coupler.

7. The magnetic coupling system of claim 5 wherein the first magnetic portion includes a first magnet having a pole facing outward, and wherein the second magnetic portion includes a second magnet having an opposite pole facing outward.

8. The magnetic coupling system of claim 2 wherein the first magnetic coupler includes tangs extending axially relative to the first magnetic coupler and radially inwardly toward a longitudinal axis of the first magnetic coupler, the tangs defining a coupling region, and wherein the second magnetic coupler includes at least one radial portion extending radially outwardly from the second magnetic portion, the radial portion being configured to be received in the coupling region of the first magnetic portion such that the first magnetic portion is configured to magnetically engage the second magnetic portion and the tangs are configured to mechanically engage the radial portion if the magnetic portions disengage magnetically.

9. The magnetic coupling system of claim 1 further comprising:
a linear actuator; and
a drive shaft coupled to the linear actuator, wherein the first magnetic coupler is located at one end of the drive shaft.

* * * * *